US012790139B2

(12) United States Patent
Petersen

(10) Patent No.: US 12,790,139 B2
(45) Date of Patent: Nov. 10, 2026

(54) SYSTEM AND METHOD FOR DENESTING RECEPTACLES FROM A STACK

(71) Applicant: QUPAQ ApS, Brønderslev (DK)

(72) Inventor: Erik Benned Petersen, Nr.Sundby (DK)

(73) Assignee: QUPAQ APS, Brønderslev (DK)

( * ) Notice: Subject to any disclaimer, the term of this patent is extended or adjusted under 35 U.S.C. 154(b) by 50 days.

(21) Appl. No.: 19/034,690

(22) Filed: Jan. 23, 2025

(65) Prior Publication Data

US 2025/0243019 A1 Jul. 31, 2025

(30) Foreign Application Priority Data

Jan. 25, 2024 (EP) .................................... 24153931

(51) Int. Cl.
*B65G 59/10* (2006.01)

(52) U.S. Cl.
CPC .... *B65G 59/103* (2013.01); *B65G 2201/0258* (2013.01)

(58) Field of Classification Search
CPC .................................................... B65G 59/103
See application file for complete search history.

(56) References Cited

U.S. PATENT DOCUMENTS 3,104,780 A 9/1963 Carter et al.
3,283,955 A 11/1966 Crabtree
4,260,311 A * 4/1981 Hanses .................. B31B 50/00 156/196
4,288,003 A * 9/1981 Fries, Jr. .............. B65G 59/108 221/222
4,439,101 A 3/1984 Orlowski et al.
4,961,684 A * 10/1990 Provan ................. B65G 59/108 221/222
5,064,093 A * 11/1991 Davis ................... B65G 59/108 221/222
7,641,438 B2 * 1/2010 Jaspers ................ B65G 47/918 221/241

(Continued)

FOREIGN PATENT DOCUMENTS

EP 3 566 985 A1 11/2019

OTHER PUBLICATIONS

European Search Report for App. No. 24 15 3931, issued May 30, 2024.

*Primary Examiner* — Gene O Crawford
*Assistant Examiner* — Ayodeji H Ojofeitimi
(74) *Attorney, Agent, or Firm* — Schmeiser Olsen PLLC

(57) ABSTRACT

A system for denesting associated receptacles from a stack, such as a stack of trays, cups or other receptacles is provided, the system including: a pair of bottom supports for holding the stack of receptacles from the bottom of the stack, a first pair of cam discs for at least guiding the pair of bottom supports, a pair of side supports for supporting the stack of receptacles from the sides of the stack, a second pair of cam discs for at least guiding the pair of side supports, a pair of separators for separating a lowermost receptacle from the stack of receptacles and for guiding the lowermost receptable downwards away from the stack, a third pair of cam discs for at least guiding the pair of separators, and a pair of main drive shafts. A method for denesting a stack of receptacles is also provided.

15 Claims, 5 Drawing Sheets

(56) References Cited

U.S. PATENT DOCUMENTS

| | | | | |
|---|---|---|---|---|
| 11,731,844 | B2 * | 8/2023 | Streu | B65G 59/061<br>414/815 |
| 11,827,457 | B2 * | 11/2023 | Du Bois | A47F 10/06 |
| 12,466,716 | B2 * | 11/2025 | Zheng | B67B 6/00 |
| 2013/0248546 | A1 * | 9/2013 | Miedema | B65G 59/107<br>221/277 |
| 2013/0248548 | A1 * | 9/2013 | Miedema | B65G 59/062<br>221/258 |

* cited by examiner

SYSTEM AND METHOD FOR DENESTING RECEPTACLES FROM A STACK

CROSS-REFERENCE TO RELATED APPLICATIONS

This application claims priority to European Application No. 24153931.1, having a filing date of Jan. 25, 2024, the entire contents which are hereby incorporated by reference.

FIELD OF TECHNOLOGY

The following relates to a system for denesting associated receptacles from a stack, such as a stack of trays, cups or other receptacles, embodiments of the system comprising:

- a pair of bottom support means (hereinafter bottom support means also means bottom supports) for supporting the stack of receptacles from the bottom of the stack,
- a first pair of cam discs for at least guiding the pair of bottom support means,
- a pair of side support means (hereinafter bottom side support means also means side supports) for supporting the stack of receptacles from the sides of the stack,
- a second pair of cam discs for at least guiding the pair of side support means,
- a pair of separator means (hereinafter (separator means also means separators) for separating a lowermost receptacle from the stack of receptacles and for guiding the lowermost receptable downwards away from the stack,
- a third pair of cam discs for at least guiding the pair of separator means, and
- a pair of main drive shafts.

Furthermore, the following relates to a method for denesting a stack of receptacles, such as a stack of trays, cups or other receptacles, wherein embodiments of the method comprises the steps of:

- providing a stack of receptacles,
- holding the stack of receptacles by a pair of bottom support means,
- moving a pair of side support means towards the stack of receptacles,
- withdrawing the bottom support means away from the stack, the removement is provided by rotation of a pair of cam discs,
- holding the stack of respectables by the pair of side support means, wherein the holding is provided by an opposing clamping force at the sides of the stack of receptacles,
- moving a pair of separator means towards the lowermost receptacle in the stack of receptacles,
- providing an opposing clamping force by the pair of separator means on the lowermost receptacle of the stack of receptacles,
- moving at least a part of the pair of separator means in a downwards direction while providing the pressure on the lowermost receptacle,
- denesting the lowermost receptacle from the stack,
- releasing the denested receptacle from the pressure of the separator means by moving the pair of separator means away from receptacle,
- moving the pair of bottom support means towards the bottom of the stack of receptacles for catching and holding the stack,
- withdrawing the side support means from the stack of receptacles,

- dropping down the stack of receptacles and gripping the stack of receptacles by the bottom support means, wherein the steps of embodiments of the method can be executed in any order and/or executed simultaneously.

BACKGROUND

Within the area of denesting systems, especially denesting systems for stacks of receptacles such as trays, cups or other receptacles, numerous solutions are known and available today.

However, all the systems for denesting known today require that the receptacles comprise top edges, wherein the edges are used for holding the stack of receptacles and/or for denesting a receptacle from the stack of receptacles.

The necessity of edges on the receptacles is a huge and inconvenient limitation, since many receptables are provided without edges or the like.

Therefore, a denesting method and a denesting system with no requirements of specific structures, configurations, shapes, and designs of the receptacles to be denested are requested.

Hence, an improved denesting system and method for denesting an efficient and reliable system and method, suitable for denesting receptacles without an edge or the like would be advantageous, and in particular a resistant, mechanically strong, economical system and method would be advantageous.

SUMMARY

An aspect relates to a denesting system and a method for denesting that solves the above-mentioned problems.

Thus, the above-described object and several other objects are intended to be obtained in a first aspect of embodiments of the invention by providing a system for denesting associated receptacles from a stack, such as a stack of trays, cups or other receptacles, embodiments of the system comprising:

- a pair of bottom supports for holding the stack of receptacles from the bottom of the stack,
- a first pair of cam discs for at least guiding the pair of bottom support means,
- a pair of side support means for supporting the stack of receptacles from the sides of the stack,
- a second pair of cam discs for at least guiding the pair of side support means,
- a pair of separator means for separating a lowermost receptacle from the stack of receptacles and for guiding the lowermost receptable downwards away from the stack,
- a third pair of cam discs for at least guiding the pair of separator means, and
- a pair of main drive shafts.

Embodiments of the invention are particularly, but not exclusively, advantageous for providing a denesting system, wherein there is no necessity of edges on the receptacles to be denested.

The denesting system of embodiments of the invention has no requirements of a specific structures, configurations, shapes, and designs of the receptacles to be denested.

Furthermore, the denesting system is an efficient and reliable system. The denesting system is easy to maintain and clean, easy to relocate, and easy to implement and connect to a machine.

In the context of embodiments of the present invention, “bottom support means” may be understood as any means and/or structure suitable for holding and supporting a stack of receptacles from below the stack.

Within the invention, an embodiment is the bottom support means being bottom support plates.

In the context of embodiments of the present invention, “side support means” may be understood as any means and/or structure suitable for holding and supporting a stack of receptacles from the side of the stack.

In the context of embodiments of the present invention, “separator means” may be understood as any means and/or structure suitable for separating the lowermost receptacle from the stack of respectables.

In an embodiment of the invention, each drive shaft of the pair of drive shafts is coupled either directly or indirectly to:

one of the bottom support means in the pair of bottom support means, one of the first cam disc in the pair of first cam discs, one of the side support means in the pair of side support means, one of the second cam disc in the pair of second cam discs, one of the separator means in the pair of separator means, and one of the third cam disc in the pair of third cam discs.

In an embodiment of the invention, the pair of main drive shafts is coupled to each other, desirably mechanically coupled, and desirably via a coupling structure.

The embodiment is particularly, but not exclusively, advantageous for ensuring that the system is being balanced and harmonized in the movements.

In an embodiment of the invention, the system can take at least two positions:

a first position, wherein the stack of receptacles is held by the pair of bottom support means, and wherein the pair of separator means is withdrawn from the stack of receptacles, and a second position, wherein the stack of receptacles is held by at least the pair of side support means, and wherein the pair of separator means is engaging with the lowermost receptacle from the stack of receptacles.

In an embodiment, the denesting system in use is adapted for sequentially altering between the first position and the second position.

The embodiment(s) are particularly, but not exclusively, advantageous for providing a system, wherein the system can switch between different positions. The positions allow embodiments of the system to continue denesting receptables from a stack.

It should be understood that between the two positions highlighted in the embodiment, other positions occur in embodiments of the system.

In an embodiment of the invention, the pair of main drive shafts is adapted to drive at least:

the pair of bottom support means, the pair of side support means, and the pair of separator means.

The embodiment is particularly, but not exclusively, advantageous for providing a system, wherein the embodiments of the system is driven by the same drive shaft, meaning that the movements of the means are coordinated according to each other.

It should be understood that the means are guided by cam discs, and the cam discs are connected to the main drive shaft. Thereby the means are driven by the pair main drive shaft via the cam discs.

In an embodiment of the invention, the pair of separator means is adapted to separate the lowermost receptacle from the stack of receptacles by providing an opposing clamping force at the lowermost receptacle from the stack.

In an embodiment, the pair of separator means is adapted to provide an opposing clamping force at the lowermost half of the lowermost receptacles in the stack of receptacles.

The embodiment(s) is particularly, but not exclusively, advantageous for allowing the system to denest any receptacle regardless the structure.

In an embodiment of the invention, the pair of separator means is a pair of protruding rods, desirably at least substantially horizontal protruding rods.

In an embodiment of the invention, the pair of separator means comprises an engagement portion in the protruding end of the rod for engaging with the lowermost receptacle during denesting.

The embodiment(s) is particularly, but not exclusively, advantageous for providing an optimal gripping and separation of a receptacle.

In an embodiment of the invention, the engagement portion in the protruding end of the rod has a spherical shape.

The embodiment(s) is particularly, but not exclusively, advantageous for decreasing the risk of damaging the receptacles during the denesting and separation from the stack.

In an embodiment of the invention:

the separator means comprise a spring, and/or the side support means comprise a spring.

The embodiment is particularly, but not exclusively, advantageous for regulation the clamping force provided by the side support means and/or the separator means.

The regulations of the force ensure that the force provided against the receptacles does not risk the receptables being damaged.

Thereby, the force provided is enough to support and hold the stack of receptables by the side support means, and enough to separate the lowermost receptable by the separator means, but not too much to risk damaging.

In an embodiment of the invention, the pair of separator means is adapted for guiding the lowermost receptacle in a downwards direction away from the stack of receptacle.

The embodiment is particularly, but not exclusively, advantageous for providing a system wherein the denesting is made in a downwards direction, and thereby utilize gravity.

In an embodiment of the invention, the separator means are opposingly arranged.

The embodiment is particularly, but not exclusively, advantageous for providing a system, wherein the risk of damaging the receptacles is decreased.

In an embodiment of the invention, the pair of side support means are adapted for providing an opposing clamping force on the sides of the stack of receptacles for holding the stack, when the pair of bottom support means are withdrawn and not holding the stack.

In an embodiment of the invention, the pair of side support means comprises at least a rubber portion, such as a surface made of rubber material, or wherein the pair of side support means are made of rubber material.

The embodiment is particularly, but not exclusively, advantageous for providing a system, wherein the risk of damaging the receptacles is decreased, since rubber is a flexible material.

In an embodiment of the invention, the pair of side support means comprises at least an indented portion, such as a surface with indentations.

The embodiment is particularly, but not exclusively, advantageous for providing a stable and reliable holding arrangement of the stack of receptacles.

In an embodiment of the invention, the first and/or second cam disc and/or third is adapted for one-way rotation around the center axis of the cam discs.

The embodiment is particularly, but not exclusively, advantageous for ensuring that the system is being balanced and harmonized in the movements, since the cam disc can be connected to the same drive shaft.

In an embodiment of the invention:

- the cam disc(s) are adapted for operating at a constant speed, and/or
- the cam disc(s) are adapted for operating at a constant sequence.

The embodiment is particularly, but not exclusively, advantageous for ensuring the most efficient operation of the system.

In an embodiment of the invention, the system is connected to an associated machine.

The embodiment is particularly, but not exclusively, advantageous for providing a denesting system that can be easily connected to a power source, such as a machine. The denesting system may also by connected to such as a motor, an engine or any other suitable power source.

In a further aspect, embodiments of the invention relate to a method for denesting a stack of receptacles, such as a stack of trays, cups or other receptacles, wherein embodiments of the method comprises the steps of:

- providing a stack of receptacles,
- holding the stack of receptacles by a pair of bottom support means,
- moving a pair of side support means towards the stack of receptacles,
- withdrawing the bottom support means away from the stack, desirably the removement is provided by rotation of a pair of cam discs,
- holding the stack of respectables by the pair of side support means, wherein the holding is provided by an opposing clamping force at the sides of the stack of receptacles,
- moving a pair of separator means towards the lowermost receptacle in the stack of receptacles,
- providing an opposing clamping force by the pair of separator means on the lowermost receptacle of the stack of receptacles,
- moving at least a part of the pair of separator means in a downwards direction while providing the pressure on the lowermost receptacle,
- denesting the lowermost receptacle from the stack,
- releasing the denested receptacle from the pressure of the separator means by moving the pair of separator means away from receptacle,
- moving the pair of bottom support means towards the bottom of the stack of receptacles for catching and holding the stack,
- withdrawing the side support means from the stack of receptacles,
- desirably dropping down the stack of receptacles and gripping the stack of receptacles by the bottom support means, wherein the steps of embodiments of the method can be executed in any order and/or executed simultaneously.

A further aspect of embodiments of the invention is particularly, but not exclusively, advantageous for providing a method for denesting, wherein there is no necessity of edges on the receptacles to be denested.

The denesting method of embodiments of the invention has no requirements of a specific structures, configurations, shapes, and designs of the receptacles to be denested.

Furthermore, the denesting method is an efficient and reliable method.

In the context of embodiments of the invention, the “withdrawing” may be understood as moving/removing or the like.

In an embodiment of the invention, during the method at least two positions appear:

- a first position, wherein the stack of receptacles is held only by the pair of bottom means, thereby is only hold by force from the bottom of the stack, and

- a second position, wherein the stack receptacles is held only by at least the pair of side support means, and wherein the pair of separator means is separating the lowermost receptacle from the stack of receptacles.

The embodiment is particularly, but not exclusively, advantageous for providing a method, wherein the method can switch between different positions. The positions allow embodiments of the method to continue denesting receptables from a stack.

In an embodiment of the invention, the method is repeated when a further receptacle of the stack is to be denested, and wherein when embodiments of the method is repeated, the lowermost receptacle of the stack was the second lowermost receptacle of the stack before the previous denesting was performed.

The embodiment is particularly, but not exclusively, advantageous for providing a method where all the receptacles from a stack can be denested.

The first and further aspects of the present invention may each be combined with any of the other aspects. These and other aspects of the invention will be apparent from and elucidated with reference to the embodiments described hereinafter.

Embodiments from the system/product should be seen as applicable to the method, and embodiments from the method should be seen as applicable for the product/system.

BRIEF DESCRIPTION

Some of the embodiments will be described in detail, with references to the following Figures, wherein like designations denote like members, wherein.

DETAILED DESCRIPTION

Exemplary examples will now be described more fully hereinafter with reference to the accompanying drawings. In this regard, the present examples may have different forms and should not be construed as being limited to the descriptions set forth herein. Accordingly, the examples are merely described below, by referring to the figures, to explain aspects.

Throughout the specification, when an element is referred to as being "connected" to another element, the element is "directly connected" to the other element, "electrically connected", "fluidic connected" or "communicatively connected" to the other element with one or more intervening elements interposed there between.

The terminology used herein is for the purpose of describing particular examples only and is not intended to be limiting. As used herein, the terms "comprises", "comprising", "includes" and/or "including" when used in this specification specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the conventional art to which embodiments of the invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Figure 1:
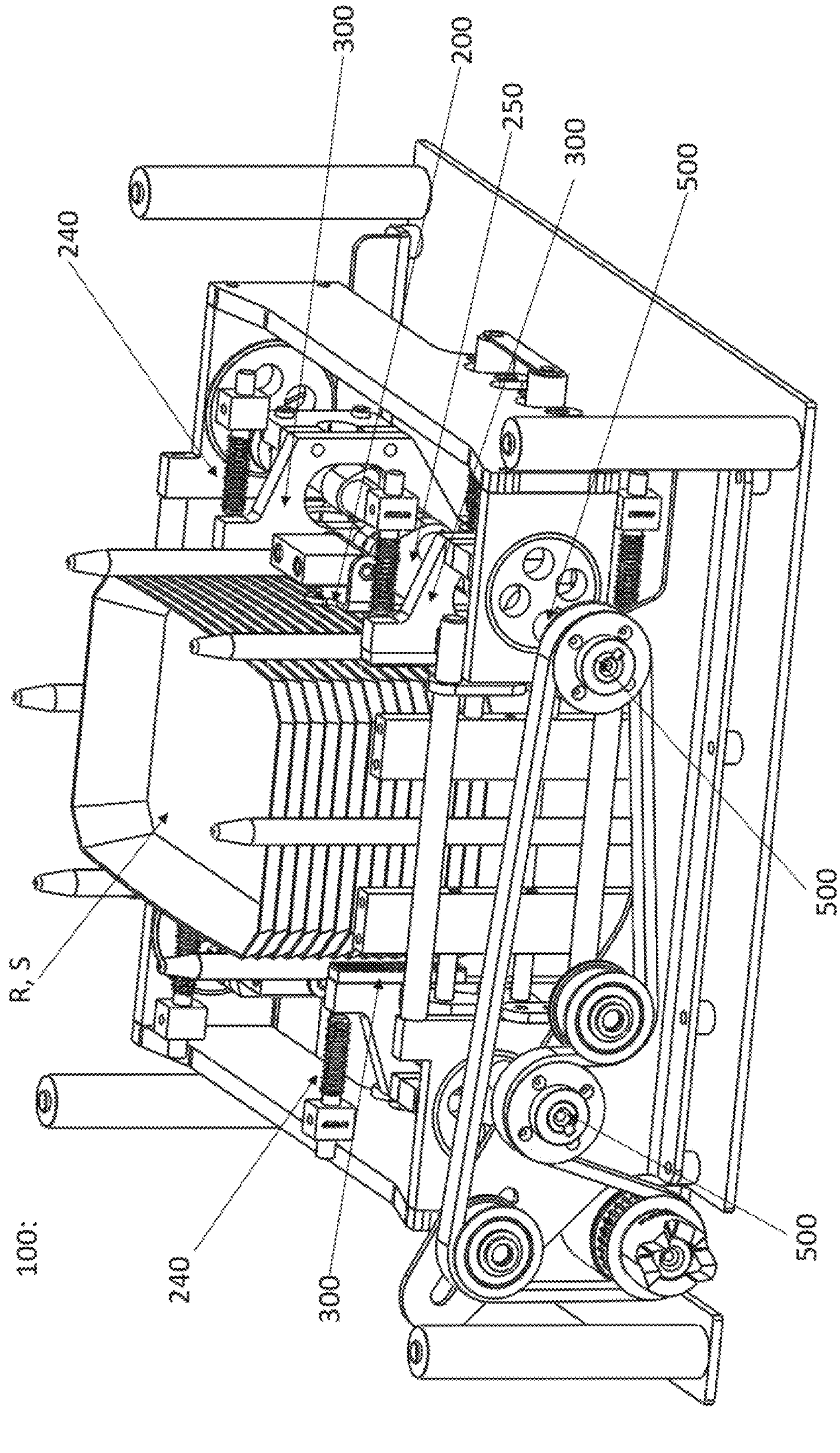
FIG. 1 illustrates a 3D drawing of embodiments of the system from the above.

FIG. 1 illustrates a 3D drawing of embodiments of the system 100 from the above. In embodiments, the system is a denesting system for denesting associated receptacles R from a stack S, such as a stack of trays, cups or other receptacles, embodiments of the system comprising:

- A pair of bottom support means 300 for supporting the stack S of receptacles R from the bottom of the stack. The bottom support means 300 are only partly visible in FIG. 1.
- A first pair of cam discs (not shown) for at least guiding the pair of bottom support means 300.
- A pair of side support means 400 for supporting the stack S of receptacles R from the sides of the stack. In FIG. 1, two pairs of side support means 400 are illustrated.
- A second pair of cam discs for at least guiding the pair of side support means 400.
- A pair of separator means 500 for separating a lowermost receptacle LR from the stack S of receptacles R and for guiding the lowermost receptable downwards away from the stack. The separator means 500 are not visible in FIG. 1 (see FIG. 3-5).
- A third pair of cam disc for at least guiding the pair of separator means 400.
- A pair of main drive shafts 500, wherein the pair of main drive shafts is adapted to drive at least:
  - The pair of bottom support means 200.
  - The pair of side support means 300.
  - The pair of separator means 400.

Furthermore, in FIG. 1 each drive shaft of the pair of drive shafts is coupled to:

- one of the bottom support means 200 in the pair of bottom support means,
- one of the first cam disc 250 in the pair of first cam discs,
- one of the side support means 300 in the pair of side support means,
- one of the second cam disc in the pair of second cam discs,
- one of the separator means 400 in the pair of separator means, and
- one of the third cam disc in the pair of third cam discs.

Moreover, in FIG. 1 is illustrated a pair of main drive shaft 500 being coupled to each other via a coupling structure.

Figure 2:
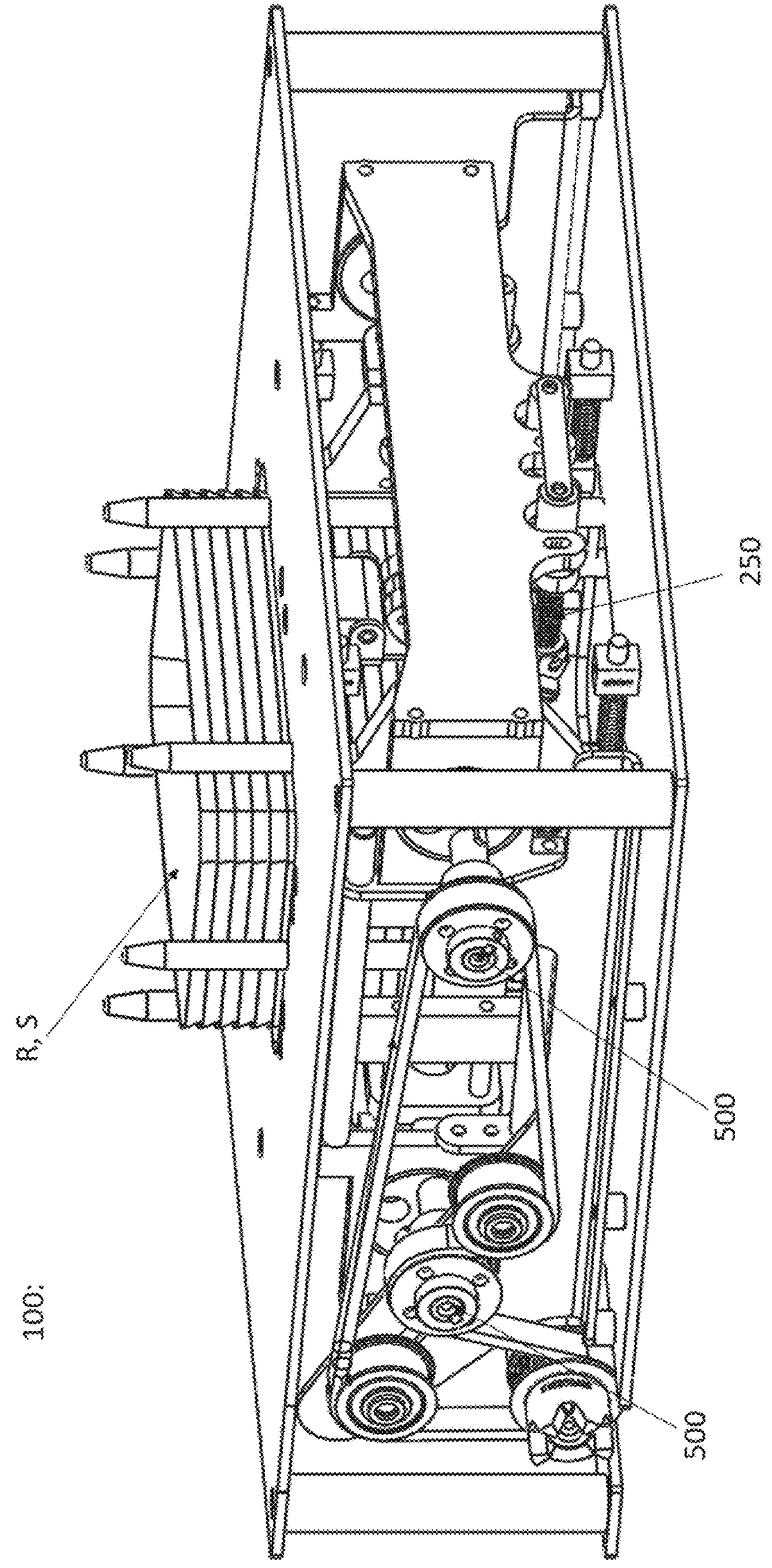
FIG. 2 illustrates a 3D drawing of embodiments of the system from the side.

FIG. 2 illustrates a 3D drawing of embodiments of the system from the side. In embodiments, the system illustrated in FIG. 2 corresponds to the system 100 illustrated in FIG. 1. In embodiments, the system is adapted to perform a method for denesting a stack S of receptacles R, such as a stack of trays, cups or other receptacles, wherein embodiments of the method comprises several steps:

- providing a stack S of receptacles R,
- holding the stack of receptacles by a pair of bottom support means 200,
- moving a pair of side support means 300 towards the stack of receptacles,
- withdrawing the bottom support means 200 away from the stack, desirably the removement is provided by rotation of a pair of cam discs 250,
- holding the stack S of respectables R by the pair of side support means 300, wherein the holding is provided by an opposing clamping force at the sides of the stack S of receptacles R,
- moving a pair of separator means 400 towards the lowermost receptacle LR in the stack of receptacles,
- providing an opposing clamping force by the pair of separator means 400 on the lowermost receptacle LR of the stack of receptacles,
- moving at least a part of the pair of separator means 400 in a downwards direction while providing the pressure on the lowermost receptacle LR,
- denesting the lowermost receptacle from the stack S,
- releasing the denested receptacle from the pressure of the separator means 400 by moving the pair of separator means away from receptacle,
- moving the pair of bottom support means 200 towards the bottom of the stack of receptacles for catching and holding the stack S,
- withdrawing the side support means 300 from the stack of receptacles,
- dropping down the stack of receptacles and gripping the stack of receptacles by the bottom support means 200, wherein the steps of embodiments of the method can be executed in any order and/or executed simultaneously.

Figure 3:
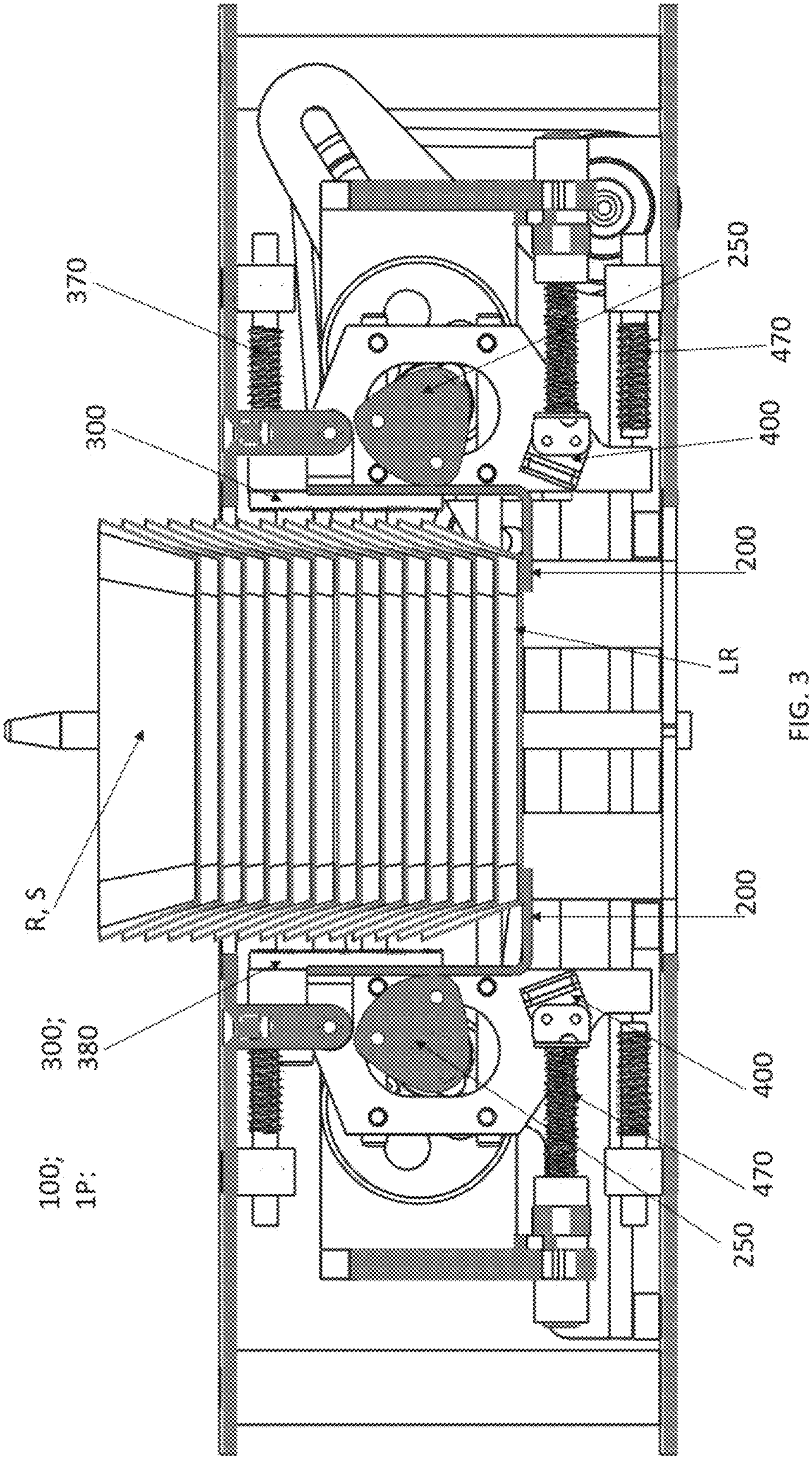
FIG. 3 illustrates a cross-section of a denesting system in a first position.

FIG. 3 illustrates a cross-section of a denesting system 100 in a first position FP. In embodiments, the system can take at least two positions.

FIG. 3 illustrate the first position FP, wherein the stack of receptacles is held by the pair of bottom support means 200, and wherein the pair of separator means is withdrawn from the stack of receptacles.

Figure 4:
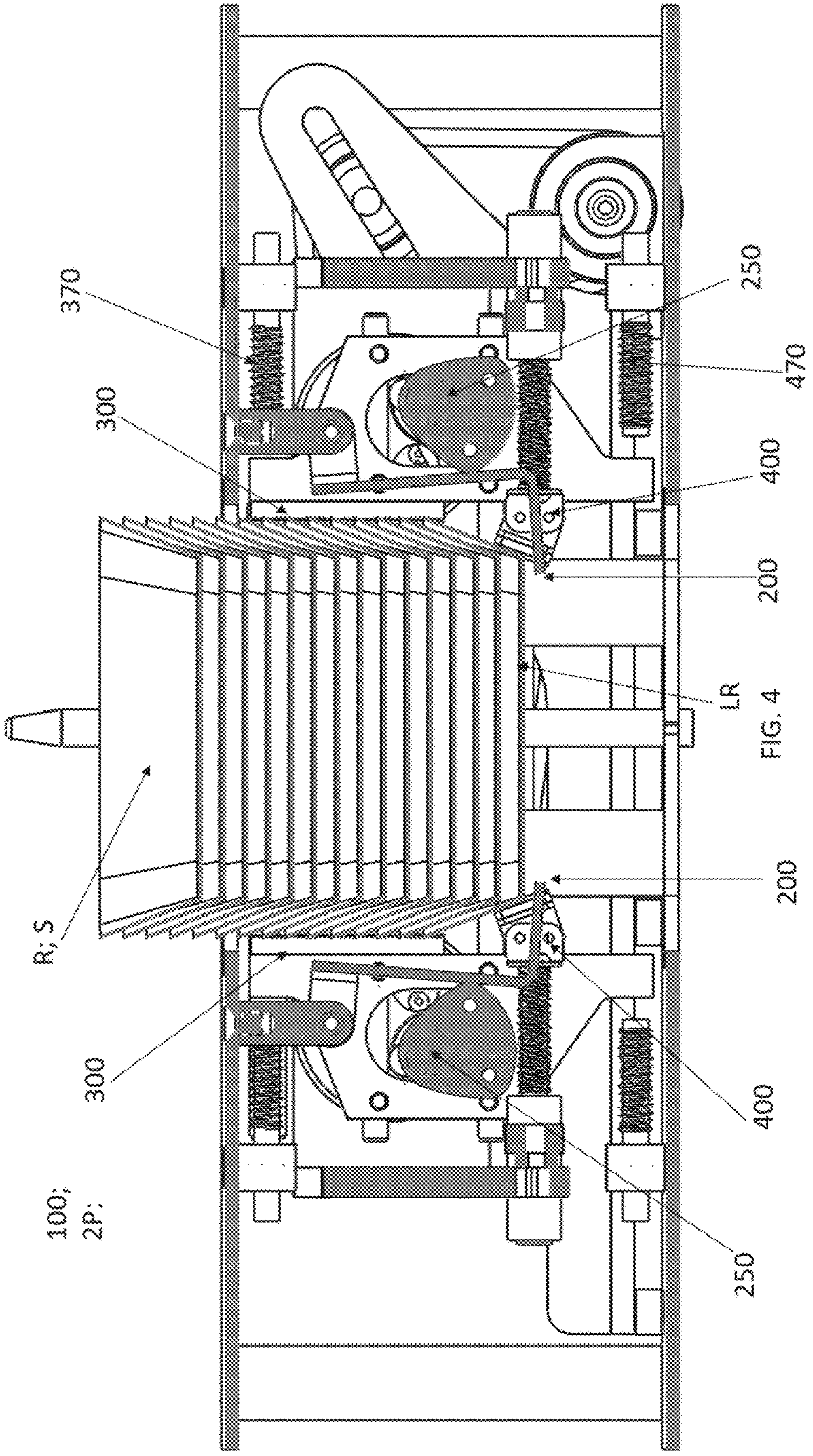
FIG. 4 illustrates a cross-section of a denesting system in a second position.

FIG. 4 illustrates a cross-section of a denesting system in a second position SP. In embodiments, the system can take at least two positions.

FIG. 4 illustrates the second position SP, wherein the stack of receptacles is held by at least the pair of side support means 300, and wherein the pair of separator means 400 is engaging with the lowermost receptacle LR from the stack S of receptacles R.

Figure 5:
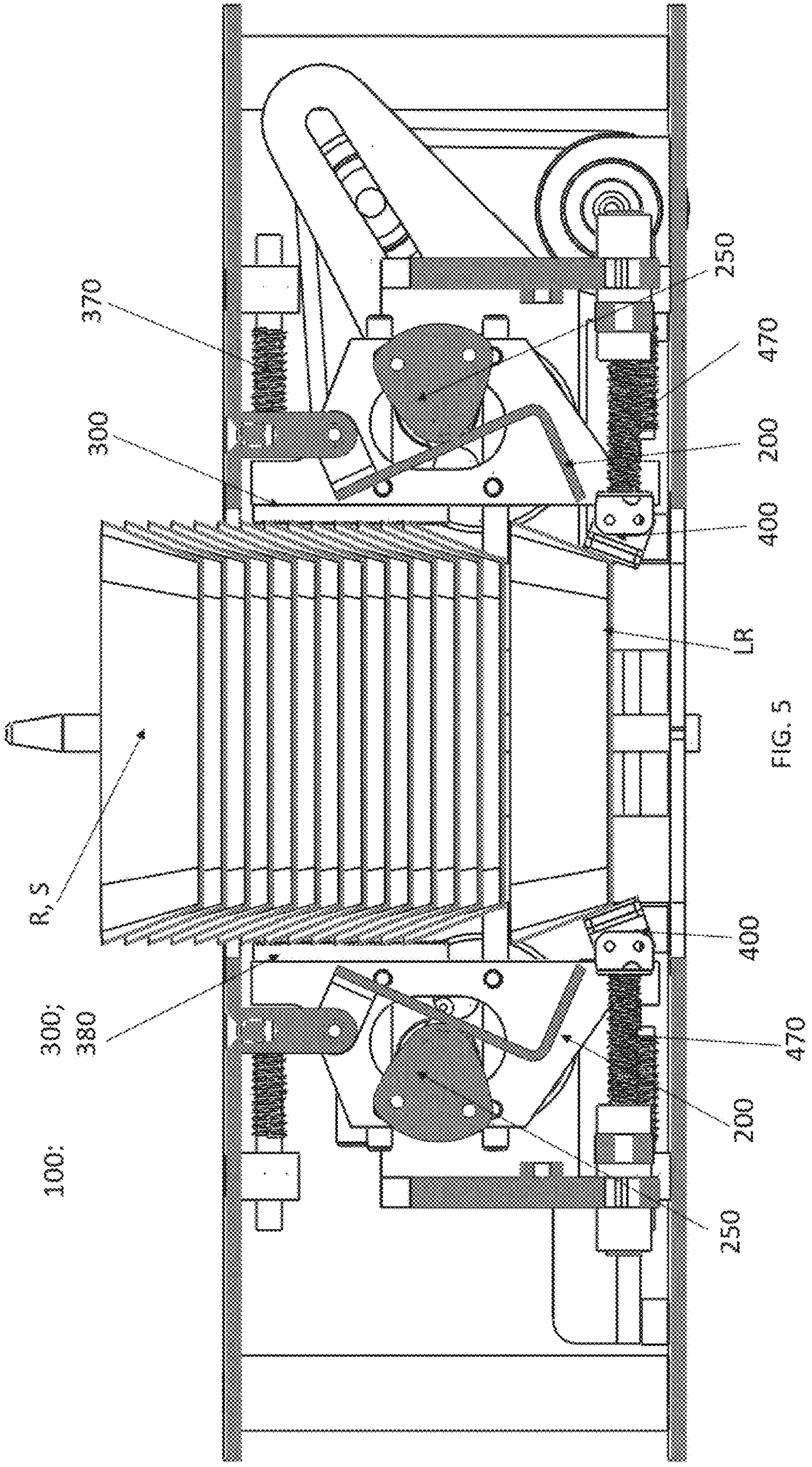
FIG. 5 illustrates a cross-section of separating means during separation.

FIG. 5 illustrates a cross-section of separating means 400 during separation.

Within embodiments of the invention, the pair of separator means are opposingly arranged. The pair of separator means is adapted to separate the lowermost receptacle from the stack of receptacles by providing an opposing clamping force at the lowermost receptacle LR from the stack.

Furthermore, the pair of separator means 400 is adapted for guiding the lowermost receptacle LR in a downwards direction away from the stack of receptacle.

In FIG. 5, the pair of separator means 400 is a pair of at least substantially horizontal protruding rods comprising an engagement portion in the protruding end of the rod, wherein the engagement portion in the protruding end of the rod has a spherical shape.

Moreover, FIG. 5 illustrates that the separator means comprise a spring 470 for regulating the force provided on the receptacles by the separator means 400.

Also illustrated is the pair of side support means 300 being adapted for providing an opposing clamping force on the sides of the stack of receptacles for holding the stack when the pair of bottom support means 200 are withdrawn and not holding the stack.

In FIG. 5, the pair of side support means comprises a rubber portion 380, such as a surface of rubber.

However, it should be understood that within the invention, other embodiments of the side supports means 400 are also desired, such as an embodiment wherein the pair of side support means 400 comprises at least an intended portion.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF FIGURE REFERENCES

System for denesting (100)
Bottom support means (200)
First pair of cam discs (250)
Pair of side support means (300)
Second pair
Spring (370)
Rubber portion (380)
Pair of separator means (400)
Third pair of cam discs
Spring (470)
Pair of main drive shafts (500)
First position (1P)
Second position (2P)
Stack (S)
Receptacles (R)
Lowermost receptacle (LR)

The invention claimed is:

1. A system for denesting associated receptacles from a stack, such as a stack of trays, cups or other receptacles, the system comprising:
- a pair of bottom supports for supporting the stack of receptacles from the bottom of the stack;
- a first pair of cam discs for at least guiding the pair of bottom supports;
- a pair of side supports for supporting the stack of receptacles from the sides of the stack;
- a second pair of cam discs for at least guiding the pair of side supports;
- a pair of separators for separating a lowermost receptacle from the stack of receptacles and for guiding the lowermost receptable downwards away from the stack;
- a third pair of cam discs for at least guiding the pair of separators; and
- a pair of main drive shafts.

2. The system according to claim 1, wherein the system can take at least two positions:
- a first position, wherein the stack of receptacles is held by the pair of bottom supports, and
- wherein the pair of separators is withdrawn from the stack of receptacles;

and
- a second position, wherein the stack of receptacles is held by at least the pair of side supports,
- and wherein the pair of separators is engaging with the lowermost receptacle from the stack of receptacles.

3. The system according to claim 2, the denesting system in use is configured for sequentially altering between the first position and the second position.

4. The system according to claim 1, wherein the pair of main drive shafts is configured to drive at least:
- the pair of bottom supports;
- the pair of side supports; and
- the pair of separators.

5. The system according to claim 1, wherein the pair of separators is configured to separate the lowermost receptacle from the stack of receptacles by providing an opposing clamping force at the lowermost receptacle from the stack.

6. The system according to claim 1, wherein:
- the separators comprise a spring,
  - and/or
- the side supports comprise a spring.

7. The system according to claim 1, wherein the pair of separators is configured for guiding the lowermost receptacle in a downwards direction away from the stack of receptacles.

8. The system according to claim 1, wherein the separators are opposingly arranged.

9. The system according to claim 1, wherein the pair of side supports are configured for providing an opposing clamping force on the sides of the stack of receptacles for holding the stack when the pair of bottom supports are withdrawn and not holding the stack.

10. The system according to claim 1, wherein the pair of side supports comprises at least a rubber portion, such as a surface made of rubber material,
- or wherein the pair of side supports are made of rubber material.

11. The system according to claim 1, wherein the pair of side supports comprises at least an indented portion, such as a surface with indentations.

12. The system according to claim 1, wherein the first cam disc and/or second cam disc and/or third cam disk is configured for one way rotation around the center axis of the cam discs.

13. The system according to claim 1, wherein
- the first, second and/or third cam disc(s) is configured for operating at a constant speed, and/or
- the first, second and/or third cam disc(s) is configured for operating at a constant sequence.

14. A method for denesting a stack of receptacles, such as a stack of trays, cups or other receptacles, with a denesting system according to claim 1, wherein the method comprises:
- providing a stack of receptacles,
- holding the stack of receptacles by a pair of bottom supports,
- moving a pair of side supports towards the stack of receptacles, withdrawing the bottom supports away from the stack, the removement is provided by rotation of a first pair of cam discs, holding the stack of receptacles by the pair of side supports, wherein the holding is provided by an opposing clamping force at the sides of the stack of receptacles, moving a pair of separators towards the lowermost receptacle in the stack of receptacles, providing an opposing clamping force by the pair of separators on the lowermost receptacle of the stack of receptacles, moving at least a part of the pair of separators in a downwards direction while providing the pressure on the lowermost receptacle, denesting the lowermost receptacle from the stack, releasing the denested receptacle from the pressure of the separators by moving the pair of separators away from receptacle, moving the pair of bottom supports towards the bottom of the stack of receptacles for catching and holding the stack, withdrawing the side supports from the stack of receptacles, dropping down the stack of receptacles and gripping the stack of receptacles by the bottom supports, wherein the steps of the method can be executed in any order and/or executed simultaneously.

15. The method for denesting according to claim 14, wherein during the method at least two positions appear:

a first position, wherein the stack of receptacles is held only by the pair of bottom supports, thereby is only held by force from the bottom of the stack; and a second position, wherein the stack of receptacles is held only by at least the pair of side supports, and wherein the pair of separators is separating the lowermost receptacle from the stack of receptacles.

* * * * *